(12) United States Patent
Deckenhoff et al.

(10) Patent No.: US 7,364,193 B2
(45) Date of Patent: Apr. 29, 2008

(54) GAS BAG MODULE

(75) Inventors: Michael Deckenhoff, Duelmen (DE); Michael Schneider, Sulzbach (DE); Klaus Freudenberger, Aschaffenburg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 234 days.

(21) Appl. No.: 11/241,483

(22) Filed: Sep. 30, 2005

(65) Prior Publication Data

US 2006/0071463 A1 Apr. 6, 2006

(30) Foreign Application Priority Data

Oct. 1, 2004 (DE) ................. 20 2004 015 294 U

(51) Int. Cl.
*B60R 21/276* (2006.01)
(52) U.S. Cl. .................................. 280/739
(58) Field of Classification Search ............. 280/739, 280/740, 741, 742, 728.2, 736
See application file for complete search history.

(56) References Cited

U.S. PATENT DOCUMENTS

| | | | |
|---|---|---|---|
| 3,758,133 A | | 9/1973 | Okada |
| 4,989,895 A | | 2/1991 | Pearson et al. |
| 5,320,011 A | * | 6/1994 | Lee ................. 83/13 |
| 5,853,192 A | * | 12/1998 | Sikorski et al. ............ 280/739 |
| 5,868,424 A | * | 2/1999 | Hamilton et al. .......... 280/741 |
| 6,199,895 B1 | | 3/2001 | Seymour |
| 6,517,108 B1 | * | 2/2003 | Vinton et al. ............ 280/739 |
| 6,588,795 B2 | * | 7/2003 | Fischer et al. ............ 280/736 |
| 6,692,021 B2 | * | 2/2004 | Amamori .................. 280/739 |
| 6,811,183 B1 | * | 11/2004 | Serban et al. ............. 280/739 |
| 6,863,304 B2 | * | 3/2005 | Reiter et al. ............. 280/739 |
| 2003/0025312 A1 | * | 2/2003 | Amamori .................. 280/739 |
| 2003/0214125 A1 | | 11/2003 | Schneider et al. |

FOREIGN PATENT DOCUMENTS

| | | |
|---|---|---|
| DE | 19733599 | 2/1999 |
| DE | 10013774 | 9/2000 |
| EP | 1279574 | 1/2003 |
| GB | 2306409 | 5/1997 |

* cited by examiner

*Primary Examiner*—Paul N. Dickson
*Assistant Examiner*—Joseph Rocca
(74) *Attorney, Agent, or Firm*—Tarolli, Sundheim, Covell & Tummino LLP

(57) ABSTRACT

A gas bag module includes a gas bag, a gas generator, a first and a second fastening element, a section of the gas bag being fastened between the first and the second fastening elements, and a discharge opening for diverting gas generated by the gas generator and introduced into the gas bag. The discharge opening can be brought from a closed state into an opened state and comprises at least one opening in the first and in the second fastening elements. A section of the gas bag extends over the discharge opening in the closed state and the gas bag is exposed towards an interior of the gas bag in a region of the discharge opening. Means are provided which partially destroy the gas bag in the region of the discharge opening, in order to uncover the discharge opening.

15 Claims, 4 Drawing Sheets

GAS BAG MODULE

TECHNICAL FIELD

The invention relates to a gas bag module.

BACKGROUND OF THE INVENTION

Usually, in a gas bag module of a vehicle occupant restraint system, the gas bag is to be inflated as quickly as possible with the gas generated by the gas generator. In particular cases it is, however, desirable not to inflate the gas bag with the entire available volume of gas, or, more generally, to discharge gas, for which reason discharge openings are provided in the gas bag module, by the freeing of which the pressure in the gas bag can be limited.

Gas bag modules are known, in which an opening which is present in the gas bag fabric is initially closed by a membrane. This membrane can be removed or destroyed as required, in order to free the discharge opening.

From the prior art, in addition gas bag modules are known in which a discharge opening is arranged in the housing in direct proximity of the gas generator. In a closed state, the discharge opening is covered by a slider or the like which can be displaced to free the opening, whereupon the gas does not flow entirely into the gas bag, but rather partially flows toward the exterior through the discharge opening. Such sliders are moved magnetically or with the aid of pyrotechnics and have the disadvantage that they require a guide which represents an additional component and in addition represents an additional source for error. Also, such magnetic valves are often comparatively slow owing to the build-up of a magnetic field.

Furthermore, modules are known in which the module housing is provided with a pyrotechnic device such as a detonating cord so that on its activation an opening is produced in the housing through which gas can be discharged. For this, of course, high forces are necessary and sharp edges can occur on the housing.

It is therefore an object of the invention to provide a gas bag module with a discharge opening which can be freed quickly and reliably.

BRIEF SUMMARY OF THE INVENTION

This is achieved in a gas bag module provided with a gas bag, a gas generator, a first and a second fastening element, a section of the gas bag being fastened between the first and the second fastening elements, and with a discharge opening for diverting gas generated by the gas generator and introduced into the gas bag, the discharge opening being able to be brought from a closed state into an opened state. The discharge opening comprises at least one opening in the first and in the second fastening elements, with a section of the gas bag extending over the discharge opening in the closed state and the gas bag being exposed in a region of the discharge opening towards the interior of the gas bag. Means are provided which partially destroy the gas bag in the region of the discharge opening, in order to uncover the discharge opening. In this way, a stable system is provided, which can be actuated quickly and reliably, in order to free a discharge opening in a region of the module housing facing away from the occupant. As the openings in the fastening elements, which can be for example a generator carrier and a gas bag holding frame, are already present, merely a section of the gas bag has to be opened, which can take place particularly simply and with comparatively little force. Here, owing to the defined position of the discharge opening, an alignment of gas bag and housing with respect to each other can be dispensed with.

Preferably, the gas bag is tensioned over the discharge opening, whereby the freeing of the discharge opening is substantially facilitated. With sufficiently great tension of the gas bag, it is sufficient to perforate it by the means, with the gas bag tearing further abruptly owing to its internal pressure after perforation.

Advantageously, the means for uncovering the discharge opening are additional means which are functionally separated from the gas generator. Thus, it is possible to free the discharge opening entirely independently from the gas generator, for example after an established period of time or in response to a sensor signal. The freeing of the discharge opening can therefore take place at a freely selectable moment, e.g. also already before the triggering of the generator.

According to a preferred embodiment, the means for uncovering the discharge opening destroy the gas bag substantially along an open contour. This contour can be, for example, a U-shaped line or an open circular line. Thereby, in the region of the discharge opening, a flap of gas bag fabric is produced which continues to be securely connected with the gas bag and therefore does not involve the danger of possibly becoming a free flying object.

Advantageously, the means for uncovering the discharge opening are at least partially arranged along an edge of the discharge opening. In this way, it is ensured that the maximum area provided by the present openings can be used as a discharge opening, in order to provide for a rapid reduction of pressure or pressure rise in the gas bag.

The means for uncovering the discharge opening can comprise a pyrotechnic unit. This ensures a rapid freeing of the discharge opening without undesired delays. For control, possibly free channels, or channels which have become free, of a pyrotechnic unit with a valve characteristic, operating as control apparatus, can be used.

According to a preferred embodiment, the pyrotechnic unit is triggered by an igniter of the gas generator, whereby savings can be made as regards components.

According to a further embodiment, the pyrotechnic unit is triggered by a separate igniter, which provides for a particularly flexible opening of the discharge opening.

The means for uncovering the discharge opening can comprise a pre-stressed drive spring, which represents a particularly favourably priced development, not liable to break down.

Advantageously, the means for uncovering the discharge opening have a hinged cutting device. Thus, a simple and reliable mechanism is produced for freeing the discharge opening.

Preferably, the means for uncovering the discharge opening have a tube which is connected with the igniter. Thus, the necessary construction space can be reduced and, in particular in the case of a plastic tube, the mass of the opening mechanism can be greatly reduced.

According to a preferred embodiment, the tube is filled with a pyrotechnic material. Again, a particularly fast acting freeing device is obtained without inertia in the system itself.

The tube can be provided with several openings through which, on actuation of the igniter, hot gas emerges and flows towards the gas bag in the region of the discharge opening, in order to destroy the gas bag in a defined manner. Thus, a particularly light and nevertheless reliable arrangement is produced, without inert parts.

According to a preferred embodiment, the means for uncovering the discharge opening have one of a match cord and detonating cord, which advantageously is arranged so close to the gas bag fabric that it destroys the latter directly. The match cord or detonating cord forms a fast acting and reliable freeing device which, in addition, requires minimal construction space.

Preferably, the match cord or detonating cord is constructed as a cord which in the closed state of the discharge opening is guided at least once through the gas bag fabric. This ensures, in addition to a very good thermal contact, in particular a reliable arrangement and positioning of the match cord or detonating cord on the gas bag.

DETAILED DESCRIPTION OF THE DRAWINGS

Figure 1:
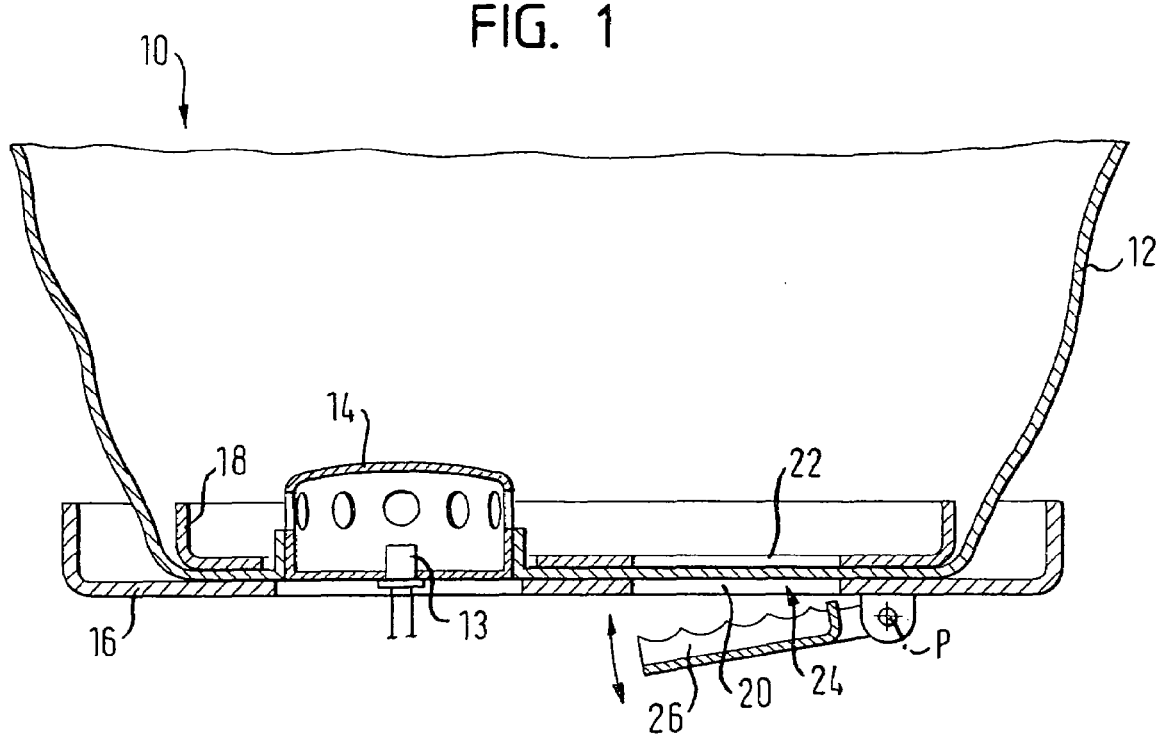
FIG. 1 shows a partial sectional view of a gas bag module according to a first embodiment of the invention.

A gas bag module 10 shown in part in FIG. 1 has a gas bag 12 which is shown in the unfolded state, and a gas generator 14 provided with an igniter 13. In addition, a first fastening element in the form of a generator carrier 16 and a second fastening element in the form of a gas bag holding frame 18 lying inside the gas bag are provided, between which a section of the gas bag 12 (also known as inflation opening) is clamped for the purpose of fastening.

Figure 2:
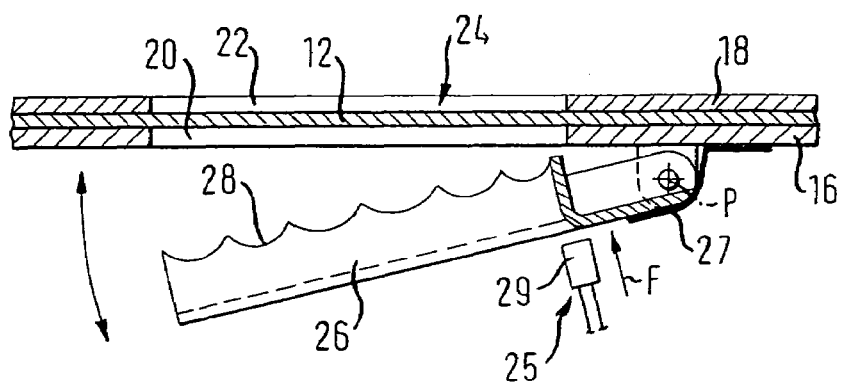
FIG. 2 shows an enlarged illustration of the discharge opening of the gas bag module of FIG. 1 in a closed state.

In the generator carrier 16 an opening 20 is provided, which is substantially identical with an opening 22 in the holding frame 18. These two openings 20 and 22, arranged one over the other, form an outflow opening 24 which, in the state shown in FIGS. 1 and 2, is closed by a section of the gas bag 12. Here, the section of the gas bag 12 is tensioned in the region of the discharge opening 24 and is exposed towards the interior of the gas bag, as can best be seen in FIG. 2; therefore, no additional parts, e.g. a slider or the like, are provided.

Beneath the generator carrier 16 a hinged cutting device 26 is arranged, which in a point P is pivotally connected with the generator carrier 16. The cutting device 26 has at least one cutting edge 28 and is, in addition, constructed and arranged in the region of the discharge opening 24 so that, on actuation, it can destroy the gas bag 12 substantially along an open contour in the form of a U-shaped line along an edge of the discharge opening 24.

The cutting device 26 forms, together with a drive means which may be a pyrotechnic unit 25 or a pre-stressed drive spring 27, the means for uncovering the discharge opening 24. In the case where the drive means is a pyrotechnic unit 25, this can either be triggered by the igniter 13 of the gas generator 14 or by a separate igniter 29.

Figure 3:
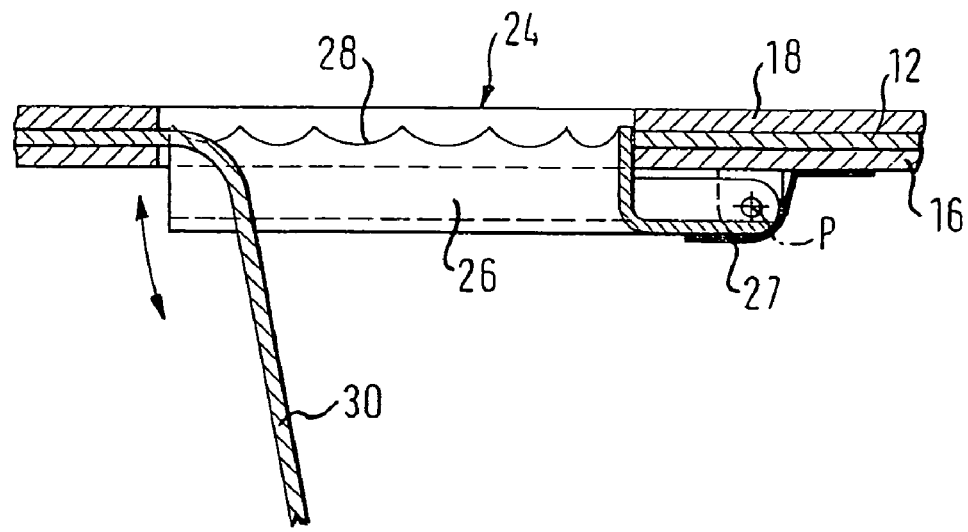
FIG. 3 shows the discharge opening of FIG. 2 in an opened state.
Figure 4:
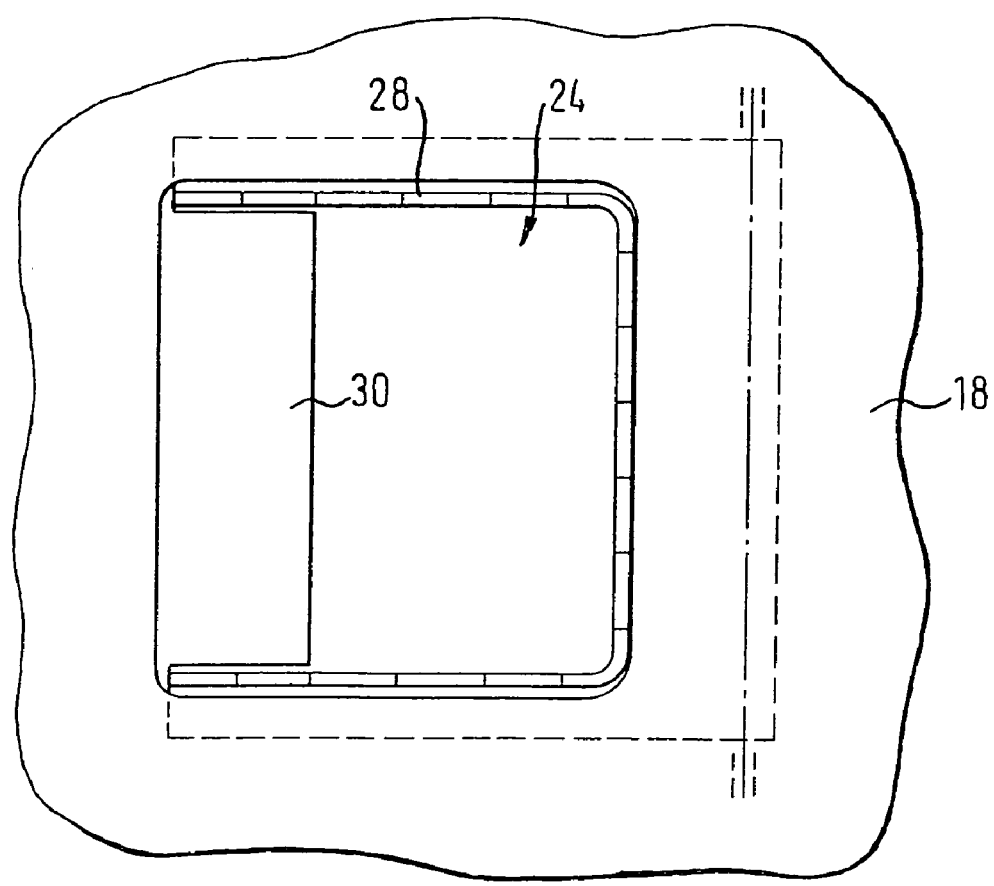
FIG. 4 shows a top view onto the opened discharge opening of FIG. 3.

If a situation now occurs, in which it appears to be desirable to reduce the internal pressure of the triggered gas bag 12, the drive means is actuated, which exerts a force F onto the cutting device 26 (FIG. 2). Thereby, the cutting device 26 is pivoted upwards about the point P and cuts the gas bag fabric, which is tensioned over the discharge opening 24, along three sides of the discharge opening 24 constructed in a rectangular shape in the figures. The gas bag fabric is cut fully or is at least perforated, in the latter case the fabric tearing open owing to the internal pressure of the gas bag 12, and thus freeing the discharge opening 24. In so doing, a flap 30 of gas bag fabric is produced, which continues to be securely connected with the gas bag 12, as is shown in FIGS. 3 and 4.

Figure 5:
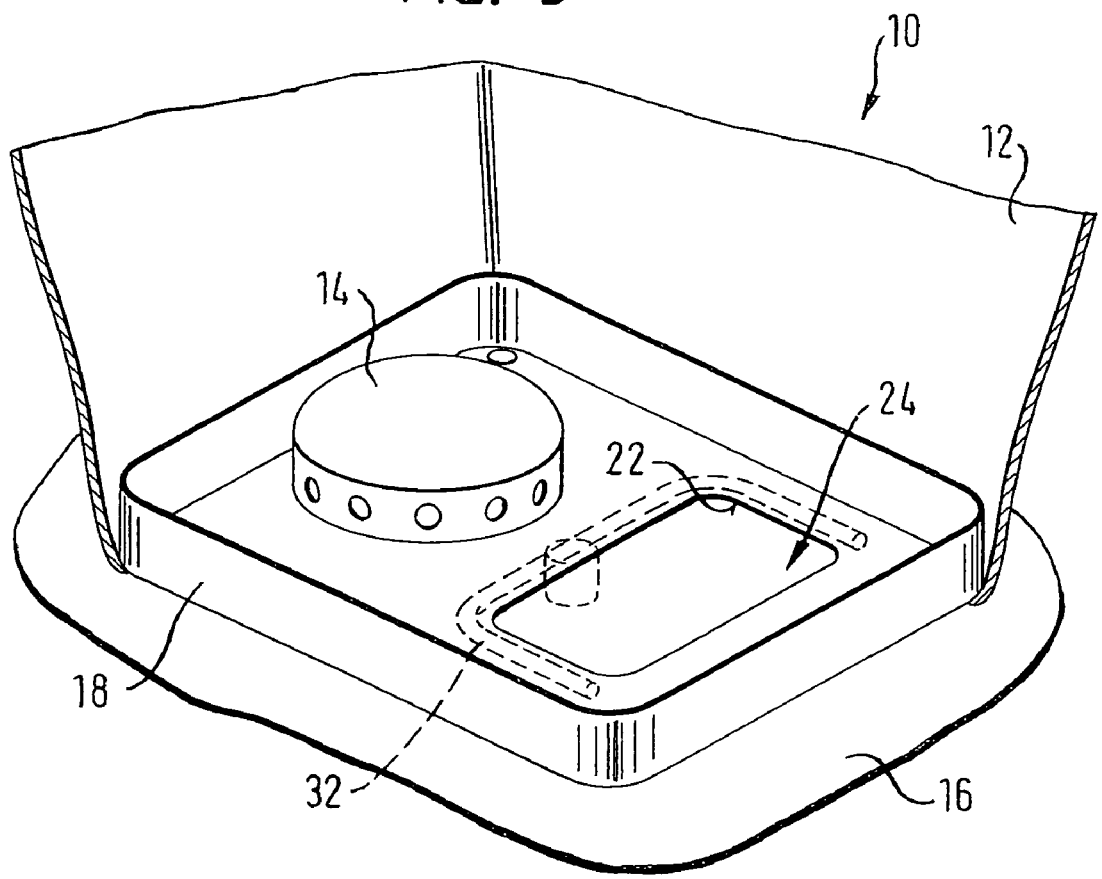
FIG. 5 shows a perspective view, partially in section, of a gas bag module according to a second embodiment of the invention.

FIG. 5 shows a further embodiment of a gas bag module 10 according to the invention, identical parts or parts identical in function having the same reference numbers and only the differences from the embodiment already described being entered into in detail below.

Figure 6:
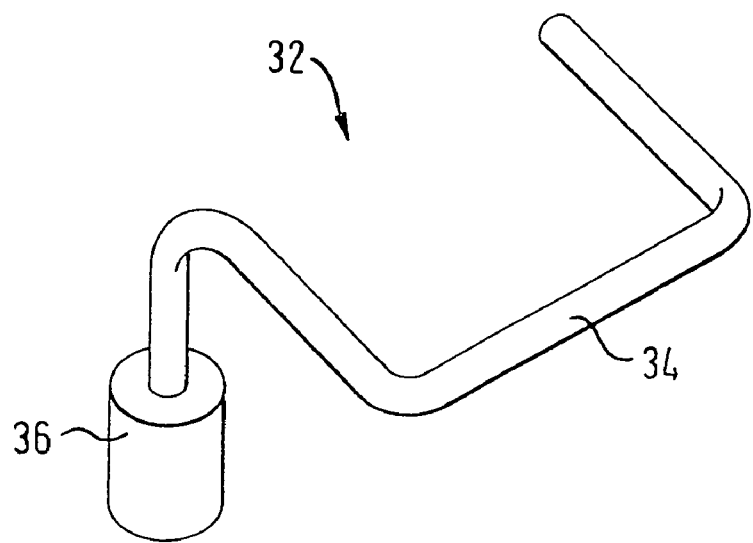
FIG. 6 shows a means for uncovering the discharge opening, which can be used in the gas bag module of FIG. 5.

As means for uncovering the discharge opening 24, instead of a cutting device a pyrotechnic unit 32 is provided, which in turn is arranged along the edge of the discharge opening 24 beneath the generator carrier 16. The pyrotechnic unit 32 can be a U-shaped plastic tube 34, shown in FIG. 6, which is filled with pyrotechnic material and is connected with an igniter 36. The igniter 36 can again be the igniter of the gas generator 14 or a separate igniter. On actuation of the igniter 36, a destruction of the plastic tube 34 is brought about, which in a linear manner unweaves the fabric of the gas bag 12 arranged directly over the tube 34 and in this way frees the discharge opening 24. Here, again, a flap 30 of gas bag fabric is produced, which folds away downwards and continues to be securely connected with the gas bag 12.

Figure 7:
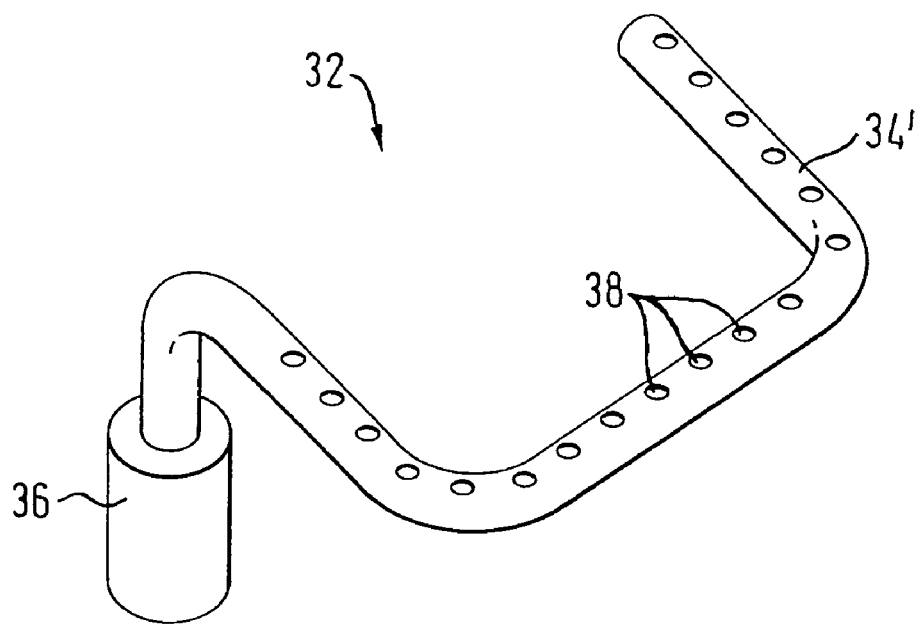
FIG. 7 shows an alternative means for uncovering the discharge opening of FIG. 5.

FIG. 7 shows an alternative embodiment of the pyrotechnic unit 32, which likewise is a U-shaped tube 34' connected with an igniter 36. In contrast to the pyrotechnic unit shown in FIG. 6, the tube 34' has several openings 38 and is not filled with pyrotechnic material. On an activation of the igniter 36, hot gas is produced which flows through the openings 38 of the tube 34' and destroys in a punctiform manner the gas bag fabric arranged directly above the tube 34' along the edge of the discharge opening 24. Owing to the internal pressure of the gas bag 12, the gas bag fabric tears in the region of the linear perforation, and a flap 30 is produced, securely connected with the gas bag 12, which frees the discharge opening 24.

Figure 8:
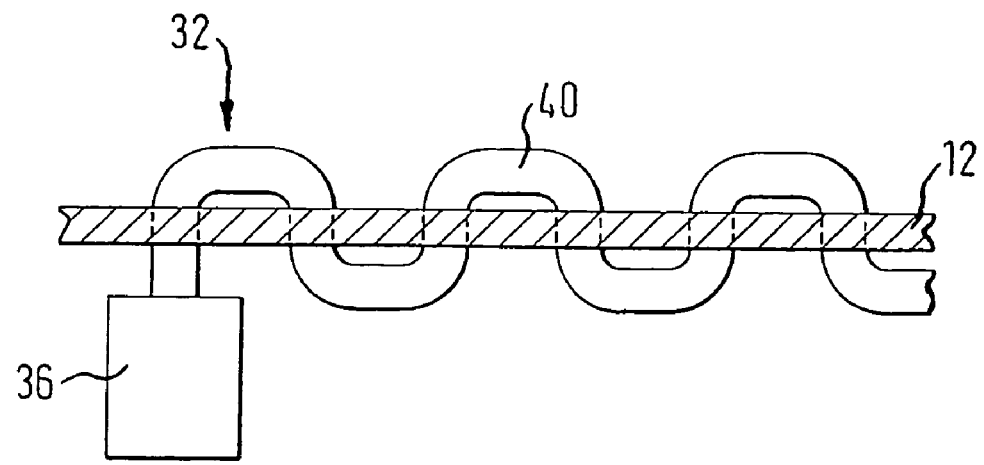
FIG. 8 shows a further embodiment of a means for uncovering the discharge opening in the gas bag module of FIG. 5.

FIG. 8 shows a third embodiment of the U-shaped pyrotechnic unit 32 of FIG. 5. This is a pyrotechnic match cord or detonating cord 40 in the form of a cord which, again, is connected with an igniter 36. The detonating cord 40 here in the closed state of the discharge opening 24 is guided several times through the fabric of the gas bag 12 on three sides of the discharge opening 24. In this way it is ensured that the detonating cord is arranged so close to the fabric of the gas bag 12 that it destroys it directly on burning after the actuation of the igniter 36 and thus frees the discharge opening 24.

The invention claimed is:
1. A gas bag module comprising:
a gas bag (12),
a gas generator (14),
a first fastening element and a second fastening element,
a section of said gas bag (12) being fastened between said first and said second fastening elements, a discharge opening (24) for diverting gas generated by said gas generator (14) and introduced into said gas bag (12), said discharge opening being able to be brought from a closed state into an opened state and comprising at least one opening (20, 22) in said first and in said second fastening elements, with a section of said gas bag (12) extending over said discharge opening (24) in said closed state and said gas bag (12) being exposed in a region of said discharge opening (24) towards an interior of said gas bag, and means which partially destroy said gas bag (12) in said region of said discharge opening (24), in order to uncover said discharge opening (24), said means (24) for uncovering said discharge opening (24) are additional means functionally separated from said gas generator (14).

2. The gas bag module according to claim 1, wherein said gas bag (12) is tensioned over said discharge opening (24).

3. The gas bag module according to claim 1, wherein said means for uncovering said discharge opening (24) comprise a pyrotechnic unit (25; 32).

4. The gas bag module according to claim 3, wherein said pyrotechnic unit (32) is triggered by an igniter (13) of said gas generator (14).

5. The gas bag module according to claim 4, wherein said means for uncovering said discharge opening (24) have a tube (34; 34') which is connected with said igniter (36).

6. The gas bag module according to claim 5, wherein said tube (34) is filled with a pyrotechnic material.

7. The gas bag module according to claim 5, wherein said tube (34') is provided with several openings (38) through which, on actuation of said igniter (36), hot gas emerges and flows towards said gas bag (12) in said region of said discharge opening (24), in order to destroy said gas bag in a defined manner.

8. The gas bag module according to claim 3, wherein said pyrotechnic unit (32) is triggered by a separate igniter (29; 36).

9. The gas bag module according to claim 1, wherein said means for uncovering said discharge opening (24) comprise a pre-stressed drive spring (27).

10. The gas bag module according to claim 1, wherein said means for uncovering said discharge opening (24) have a hinged cutting device (26).

11. The gas bag module according to claim 1, wherein said means for uncovering said discharge opening have one of a match cord and detonating cord (40).

12. The gas bag module according to claim 11, wherein said one of a match cord and detonating cord (40) is arranged so close to a fabric of said gas bag that it destroys said gas bag fabric directly.

13. The gas bag module according to claim 12, wherein said one of a match cord and detonating cord (40) is constructed as a cord which in said closed state of said discharge opening (24) is guided at least once through said gas bag fabric.

14. A gas bag module comprising:

a gas bag (12);

a gas generator (14);

a first fastening element and a second fastening element, a section of said gas bag (12) being fastened between said first and said second fastening elements;

a discharge opening (24) for diverting gas generated by said gas generator (14) and introduced into said gas bag (12), said discharge opening being able to be brought from a closed state into an opened state and comprising at least one opening (20, 22) in said first and in said second fastening elements, with a section of said gas bag (12) extending over said discharge opening (24) in said closed state and said gas bag (12) being exposed in a region of said discharge opening (24) towards an interior of said gas bag; and means which partially destroy said gas bag (12) in said region of said discharge opening (24), in order to uncover said discharge opening (24), wherein said means for uncovering said discharge opening (24) destroy said gas bag (12) substantially along an open contour in the shape of one of a U-shaped and an open circular line.

15. A gas bag module comprising:

a gas baa (12);

a gas generator (14);

a first fastening element and a second fastening element, a section of said gas bag (12) being fastened between said first and said second fastening elements;

a discharge opening (24) for diverting gas generated by said gas generator (14) and introduced into said gas bag (12), said discharge opening being able to be brought from a closed state into an opened state and comprising at least one opening (20, 22) in said first and in said second fastening elements, with a section of said gas bag (12) extending over said discharge opening (24) in said closed state and said gas bag (12) being exposed in a region of said discharge opening (24) towards an interior of said gas bag; and means which partially destroy said gas bag (12) in said region of said discharge opening (24), in order to uncover said discharge opening (24), wherein said means for uncovering said discharge opening (24) are arranged at least partially along an edge of said discharge opening (24).

* * * * *